United States Patent
Herskovitz

[11] Patent Number: 6,070,845
[45] Date of Patent: Jun. 6, 2000

[54] MULTI-FUNCTION MOUSE PAD

[75] Inventor: Stuart Herskovitz, Edgewood, N.Y.

[73] Assignee: Qosina, Edgewood, N.Y.

[21] Appl. No.: 09/363,525

[22] Filed: Jul. 29, 1999

[51] Int. Cl.[7] .................................................. A47B 91/00
[52] U.S. Cl. .................................. 248/346.01; D14/114; 248/918
[58] Field of Search .............................. 248/346.01, 118, 248/118.1, 118.3, 118.5, 918; D14/114

[56]         References Cited

U.S. PATENT DOCUMENTS

| | | | |
|---|---|---|---|
| D. 370,472 | 6/1996 | Scianna | D14/114 |
| D. 395,876 | 7/1998 | Afarian | D14/114 |
| D. 405,771 | 2/1999 | Nachinson | D14/114 |
| 5,022,170 | 6/1991 | House | 40/358 |
| 5,533,697 | 7/1996 | Fletcher | 248/146 |
| 5,952,070 | 9/1999 | Depiero | 428/40.1 |
| 5,971,340 | 10/1999 | Murphy | 248/346.01 |

*Primary Examiner*—Anita M. King
*Assistant Examiner*—Michael Nornberg
*Attorney, Agent, or Firm*—McAulay Nissen Goldberg Kiel & Hand, LLP

[57]                 ABSTRACT

A multi-function mouse pad adapted to be utilized with a computer mouse and that includes apertures therein so that the mouse pad also can be utilized as a stencil or template. The apertures may be in the form of round holes of varying diameter so that the outer diameter of a tube can be measured. The apertures may also have different geometric shapes. The mouse pad further can include a needle gauge aperture to be utilized to measure the gauge size of a needle. The mouse pad also can include round projections extending therefrom for purposes of measuring the inner diameter of round, hollow tube. Such projections can extend from the top surface or a side surface of the mouse pad.

13 Claims, 6 Drawing Sheets

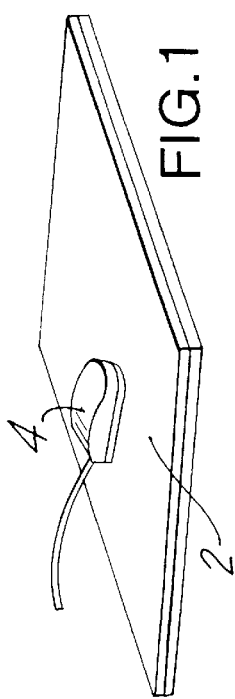
FIG. 1
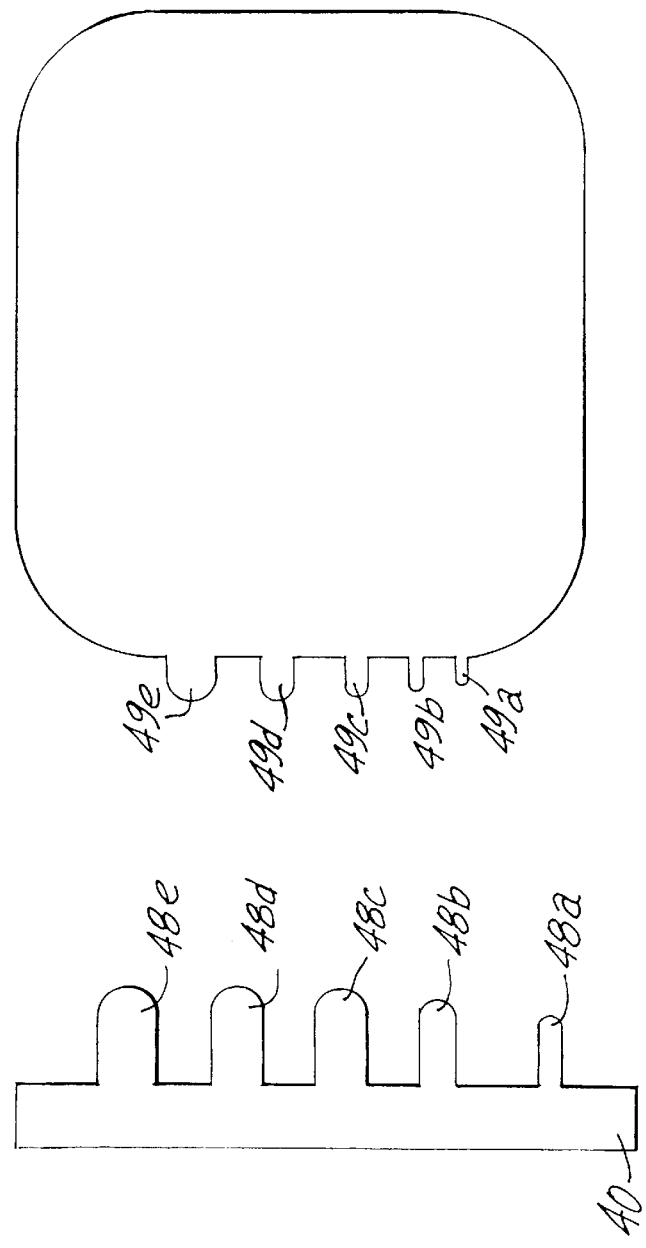
FIG. 7
FIG. 6

MULTI-FUNCTION MOUSE PAD

BACKGROUND OF THIS INVENTION

This invention relates to a mouse pad and is particularly directed to a multi-function mouse pad that is die-cut or injection molded that includes within the mouse pad itself a template or stencil for medical or other type of use.

The computer mouse currently is a standard peripheral for the personal computer. Generally accompanying the computer mouse is a mouse pad that makes mouse manipulation easier, accurate and more efficient. An illustration of a typical mouse pad 2 having a computer mouse 4 thereon is shown in FIG. 1. In addition to making mouse manipulation easier, mouse pads prevent desk and table top surfaces from being scratched by the mouse.

Currently, mouse pads serve essentially only those functions mentioned above. Mouse pads also may have aesthetic value due to their particular shape and/or the particular picture or design imprinted on the top surface of the mouse pad. There also has been an attempt to market mouse pads that are fixed to calculators. However, given the fact that mouse pads take up desk space, it would be advantageous to have such devices serve other purposes in addition to their usual mouse pad function.

It is therefore an object of this invention to provide a multi-function mouse pad that can be used in manners not previously contemplated.

It is another object of this invention to provide a multi-function mouse pad that is in the form of a stencil so that the mouse pad can be utilized both as a pad for a computer and as a stencil for various stencil functions.

It is a further object of this invention to provide a multi-function mouse pad that be utilized to measure pin gauges and/or be utilized for other medical needs.

These and other objects, advantages and features of the present invention will become readily apparent to those of ordinary skill in the art, and the novel features will be particularly pointed out in the appended claims.

SUMMARY OF THE INVENTION

In accordance with the present invention, a mouse pad includes a base that has a a mouse receiving surface adapted to receive a mouse, and the base includes a plurality of apertures that represents a template.

As an aspect of the present invention, the base includes a needle gauge aperture adapted to measure a gauge size of a needle.

As another aspect of the present invention, the apertures are circular in shape and have respectively different diameters.

As a feature of this aspect, the mouse receiving surface includes numbers thereon positioned adjacent to the apertures and that correspond to diameters of the apertures.

As a further feature, the mouse receiving surface includes numbers thereon, each of those numbers being positioned adjacent to a respective aperture and identifying an outer diameter size of a round tube with a largest outer diameter that can be fitted into that respective aperture.

As a further aspect of the present invention, the mouse receiving surface includes circular projections that have respectively different diameters adapted to measure an inner diameter of a hollow tube.

As a feature of this aspect, the mouse receiving surface includes numbers thereon, each of the numbers being positioned adjacent to a respective one of the circular projections and identifying an inner diameter size of a round, hollow tube with a smallest inner diameter that can be fitted over the respective one of the projections.

As an additional aspect of the present invention, the base includes a side surface and the side surface has extending therefrom a plurality of circular projections having respectively different diameters adapted to measure an inner diameter of a hollow tube.

As yet another aspect of the present invention, the apertures have different geometric shapes.

As yet a further aspect, the mouse receiving surface includes a ruler thereon adapted to measure distance.

In accordance with another embodiment of the present invention, a mouse pad includes a base that has a mouse receiving surface adapted to receive a mouse, and the base includes a plurality of projections adapted to measure an inner diameter of a hollow tube.

BRIEF DESCRIPTION OF THE DRAWINGS

The following detailed description, given by way of example and not intended to limit the present invention solely thereto, will be best appreciated in conjunction with the accompanying drawings, wherein like reference numerals denote like elements and parts in which:

FIG. 1 is a schematic illustration of a typical mouse pad having a computer mouse thereon;

FIG. 6 is a side view of the mouse pad shown in FIG. 5;

FIG. 7 is a schematic illustration of a multi-function mouse pad in accordance with a further embodiment of the present invention.

DETAILED DESCRIPTION OF CERTAIN PREFERRED EMBODIMENTS

Unrelated to computers, computer mouses and mouse pads are templates (also known as stencils). Templates, generally plastic or other suitable material, can perform various functions and often are designed specific to particular industries. One typical function of a template is to allow the user to draw accurate circles, squares, rectangles and other geometric shapes of various dimensions. Templates can also include thereon a ruler for measuring length, a french curve for drawing various curves, a protractor gauge for measuring angles, etc. Templates can also include electronic and logic symbols for electrical design work. Templates can further include holes of various sizes for measuring the outer dimension of a tube, pin or needle and include a needle gauge slot for measuring the gauge of needles, such generally conducted in the medical profession.

Figure 2:
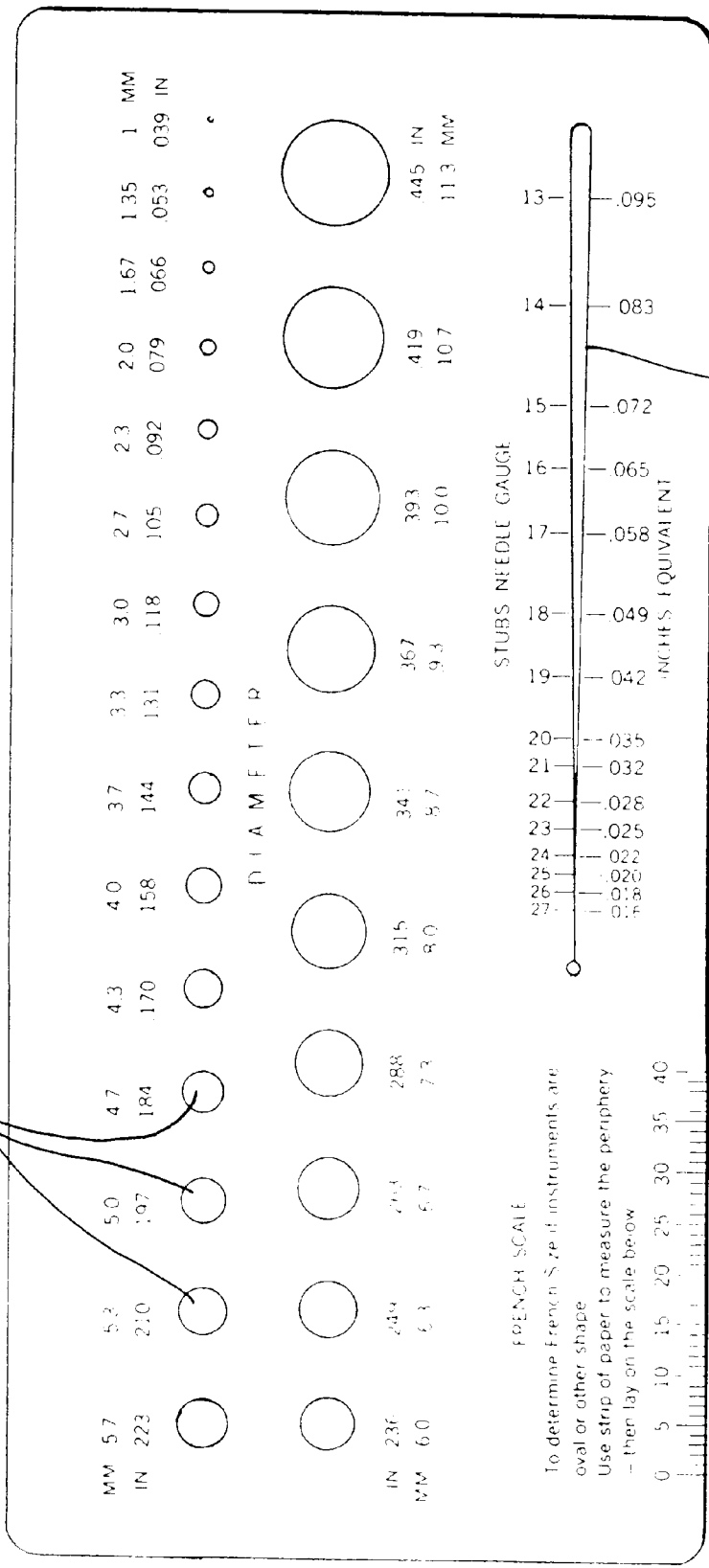
FIG. 2 is a photocopy of a medical template.
Figure 3:
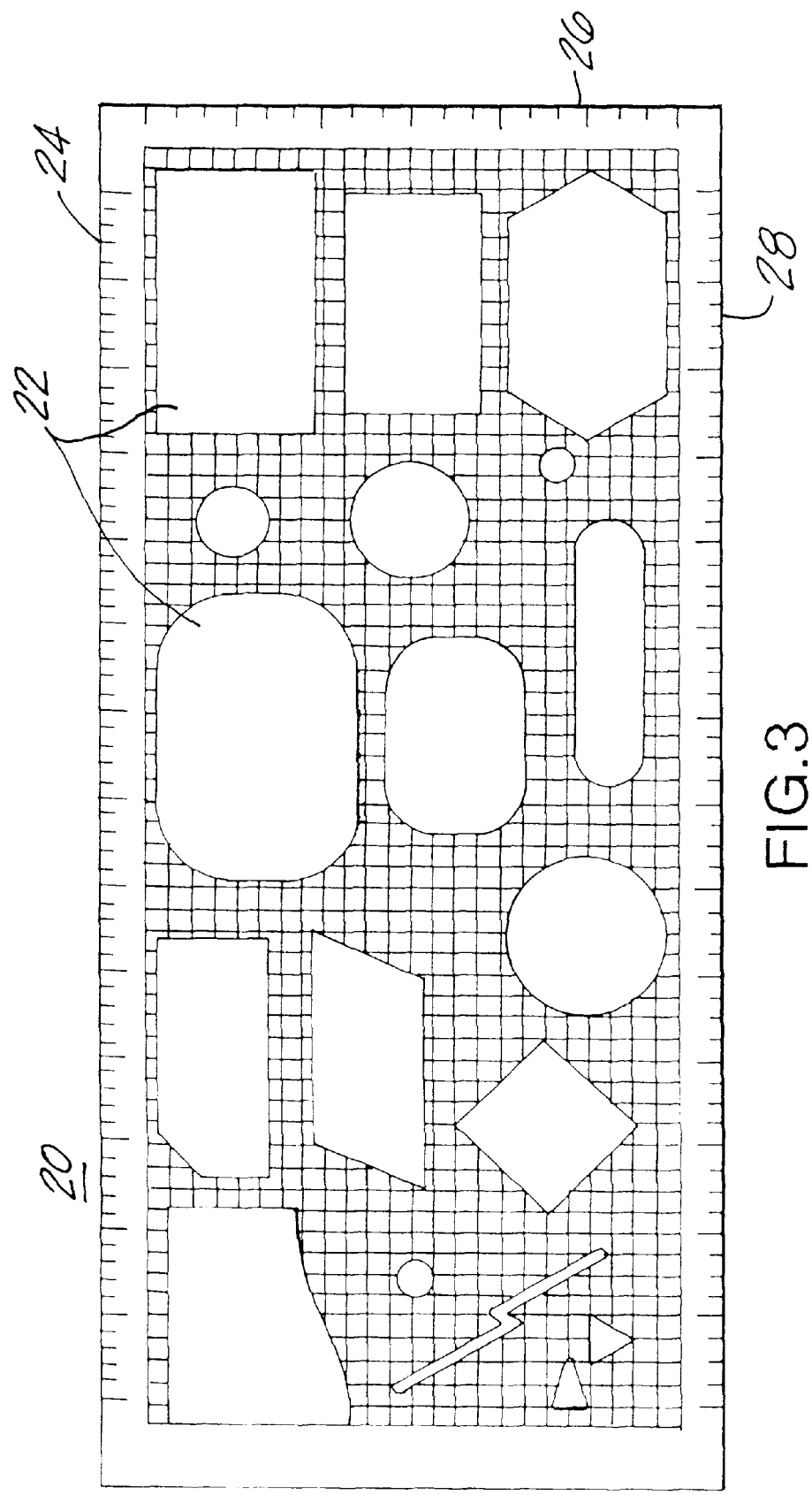
FIG. 3 is a photocopy of a template having geometric shapes therein.
Figure 4:
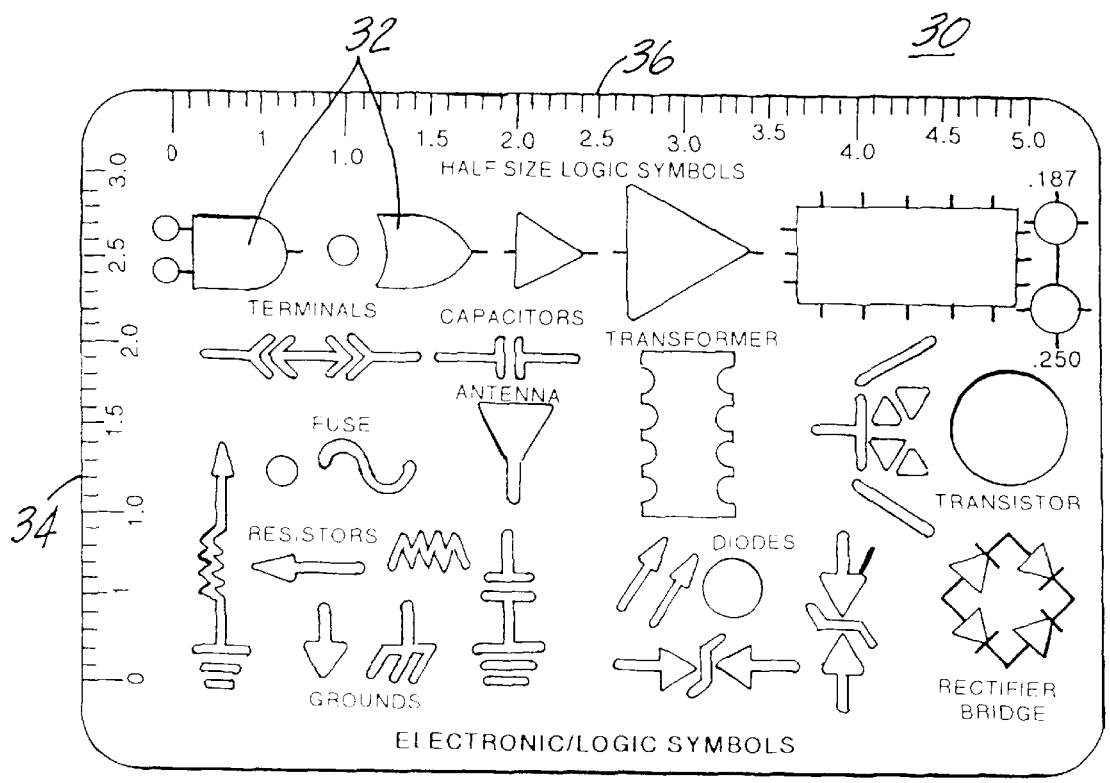
FIG. 4 is a photocopy of an electronic/logic symbol template.

FIG. 2 is a photocopy of a template that can be used to measure length, outer diameter and gauge size. As shown in FIG. 2, template 10 includes plural holes 12 for measuring the outer diameter of a pin or needle, a needle gauge 14 for measuring the gauge size of a needle, and a ruler 16 for measuring length. FIG. 3 is a photocopy of a template 20 with various geometric shapes 22 as well as three rulers 24, 26, 28. FIG. 4 is a photocopy of an electronic/logic symbol template 30 having various symbols 32 pertinent to electrical design as well as two rulers 34, 36.

Figure 5:
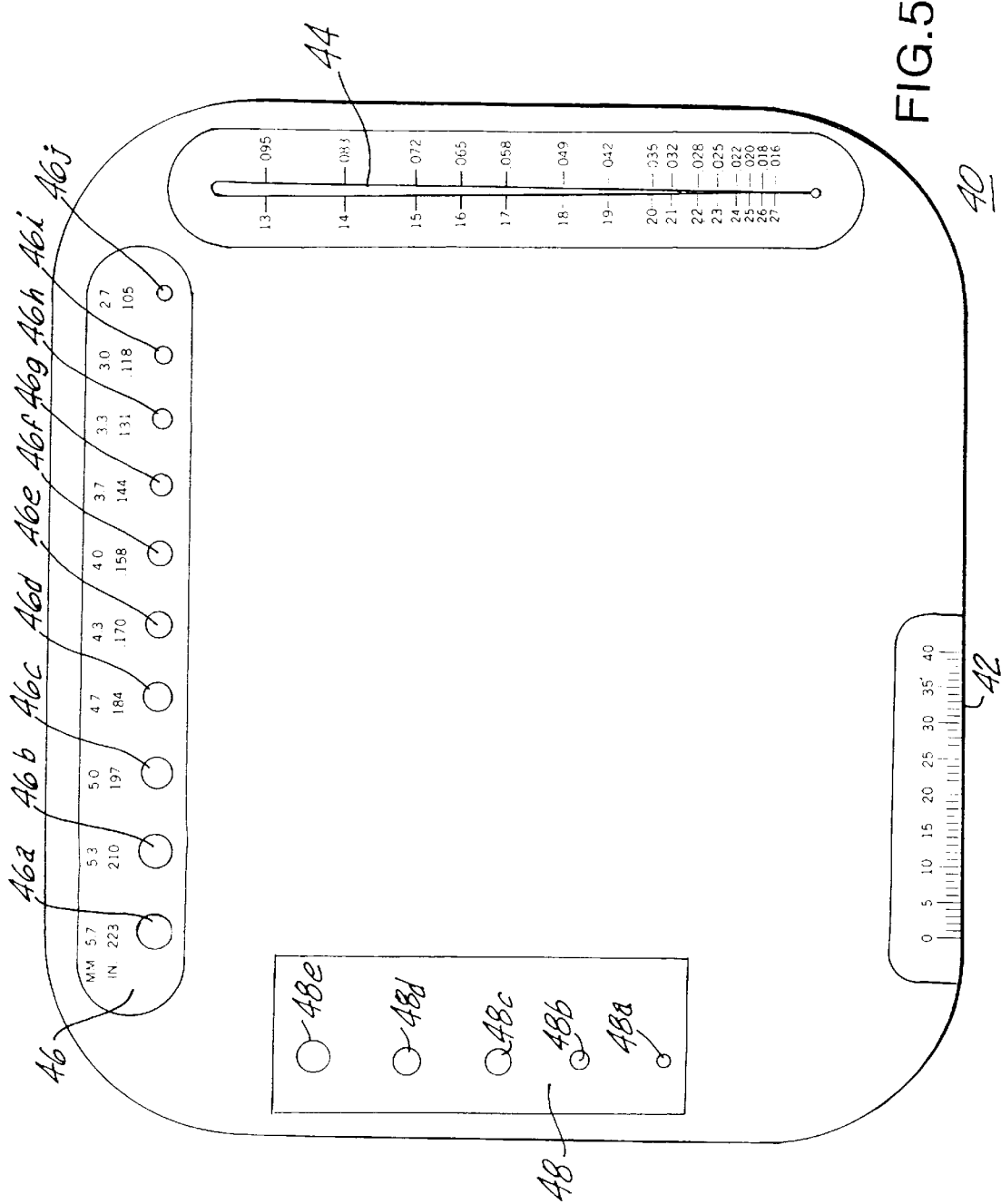
FIG. 5 is a schematic illustration of the multi-function mouse pad of the present invention.

In accordance with a first embodiment of the present invention, a multi-function mouse pad is shown in FIG. 5. The mouse pad may be die-cut or injection molded or manufactured in any other manner known in the art. As shown in FIG. 5, the multi-function mouse pad 40 is designed for medical use and includes thereon a ruler 42, a needle gauge 44, outer diameter gauge 46 having therein holes (apertures) 46a–46j of various diameters, and inner diameter gauge 48 having projections 48a–48e therein. Adjacent to the ruler's graduation marks, the needle gauge and each of the apertures and projections are numbers to identify length, gauge, outer diameter and inner diameter, respectively. Of course, the mouse pad of the present invention can include thereon one, some or all of these gauges with such gauges located at any location on the mouse pad. However, the preferred embodiment provides for gauges near the outer perimeter of the mouse pad so as to allow the center thereof for mouse manipulation.

Within the medical profession and other industries, it may be necessary to determine the gauge of a needle and needle gauge 44 within mouse pad 40 can be utilized for this task. Similarly, the outer diameter of a pin, tube, etc. can be determined utilizing outer diameter gauge 46 containing holes 46a–46j therein. Inner diameter gauge 48 includes circular projections 48a–48e and is better shown in the side view shown in FIG. 6. Projections 48a–48e are circular in shape with diameters that would correspond to the measured diameter of a tube placed thereon. As shown in FIG. 6, projections 48a–48f extend upwards from mouse pad 40 and a hollow tube can be placed over any of the projections to determine its inner diameter. Projections 48a–48e only need to project from the mouse pad by a centimeter or less so that they do not interfere with the movement of a mouse on the pad. In an alternative embodiment of the present invention, the inner diameter gauge includes projections 49a–49e that extend from the side of the mouse pad, as shown in FIG. 7 (diameters of 49a–49e shown exagerated). Projections 49a–49e, in this case, do not at all interfere with typical manipulation of a computer mouse. Projections 49a–49e as well as projections 48a–48e in the embodiment shown in FIG. 6 may be made of any suitable material. Of course, the number of projections may be different as that shown herein.

Figure 8:
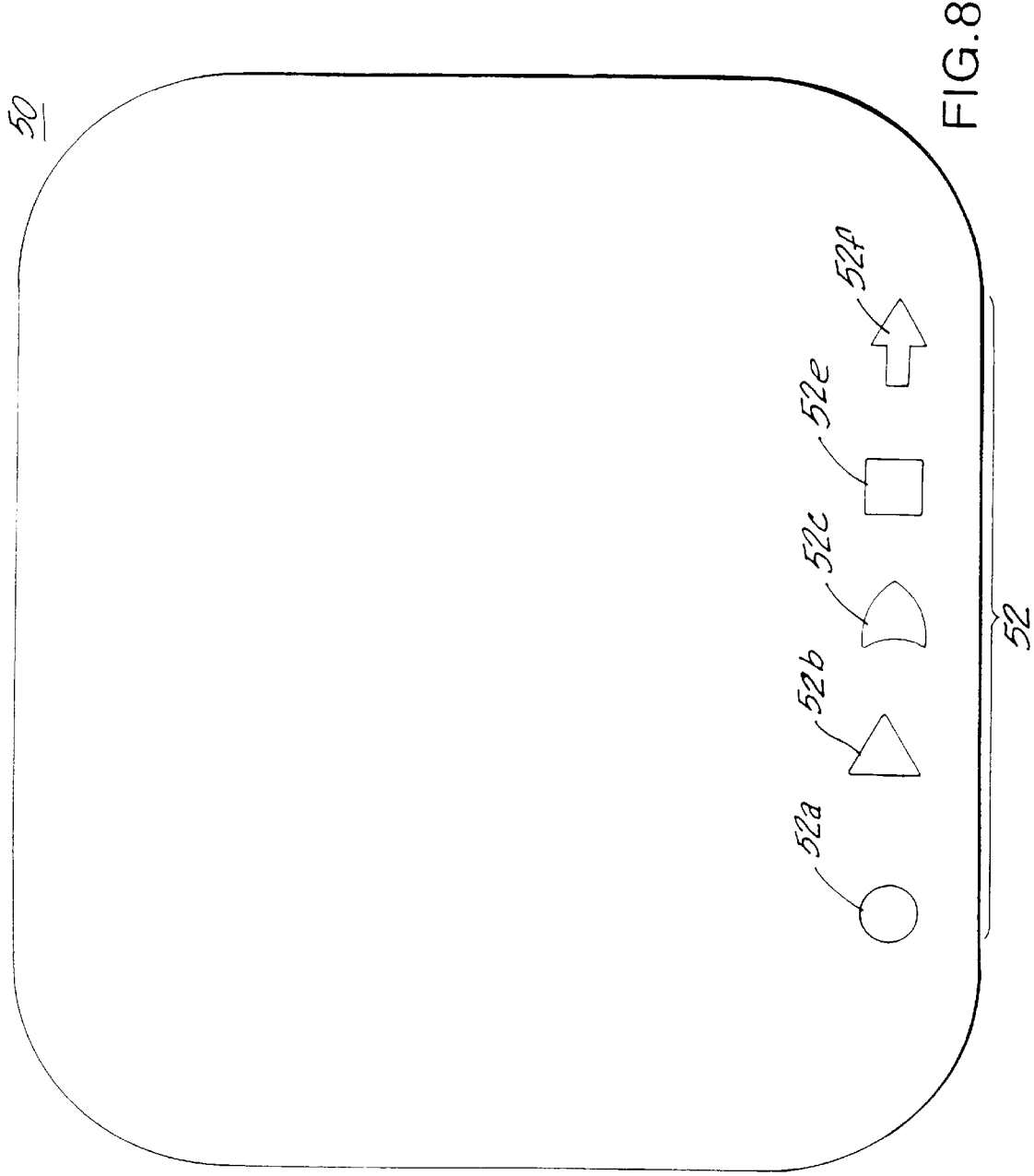
FIG. 8 is a schematic illustration of a multi-function mouse pad in accordance with another embodiment of the present invention.

FIG. 8 illustrates a mouse pad 50 in accordance with another embodiment of the present invention. As shown, mouse pad 50 includes a geometric shape and symbolic template 52. Template 52 is comprised of various apertures and includes a circular aperture 52a, a triangular aperture 52b, an "or gate" shaped aperture 52c, a square aperture 52e and an arrow-shaped aperture 52f. Apertures 52a–52f are representative of geometric shapes, logic symbols and other designs that may be included as part of the present invention and thus the present invention is not limited solely to the particular shapes shown. Given mouse pad 50, the user may perform typical mouse operations and further may conveniently draw circles, squares, etc., utilizing the template function of the present invention.

While the present invention has been particularly shown and described in conjunction with preferred embodiments thereof it will be readily appreciated by those of ordinary skill in the art that various changes may be made without departing from the spirit and scope of the invention. For example, the particular shape of the mouse pad itself may be different from that shown. Various shapes of the mouse pads include, but not limited to, round mouse pads, oval mouse pads, square mouse pads, pentagon-shaped mouse pads, etc.

As another example, the templates, apertures and projections shown herein may be positioned at different locations of the mouse pad than that shown. The apertures and/or projections may be located, for example, at the center of the mouse pad or at the corners of the mouse pad. Other locations also are possible.

Therefore, it is intended that appended claims be interpreted as including the embodiments described herein, the alternatives mentioned above and all equivalents thereto.

What is claimed is:

1. A mouse pad comprising:
    a base having a mouse receiving surface adapted to receive a mouse,
    said base including a plurality of apertures representing a template and including a needle gauge aperture adapted to measure a gauge size of a needle.

2. The mouse pad of claim 1, wherein said plurality of apertures are circular in shape and have respectively different diameters.

3. A mouse pad comprising:
    a base having a mouse receiving surface adapted to receive a mouse,
    said base including a plurality of apertures representing a template, said plurality of apertures being circular in shape and having respectively different diameters, said mouse receiving surface including a plurality of numbers thereon, each of said numbers being positioned adjacent to a respective one of said apertures and corresponding to a diameter of said respective one of said apertures.

4. A mouse pad comprising:
    a base having a mouse receiving surface adapted to receive a mouse,
    said base including a plurality of apertures representing a template, said plurality of apertures being circular in shape and having respectively different diameters, said mouse receiving surface including a plurality of numbers thereon, each of said numbers being positioned adjacent to a respective one of said apertures and identifying an outer diameter size of a round tube with a largest outer diameter that can be fitted into said respective one of said apertures.

5. A mouse pad comprising:
    a base having a mouse receiving surface adapted to receive a mouse,
    said base including a plurality of apertures representing a template, said mouse receiving surface including a plurality of circular projections having respectively different diameters adapted to measure an inner diameter of a hollow tube.

6. The mouse pad of claim 5, wherein said mouse receiving surface includes a plurality of numbers thereon, each of said numbers being positioned adjacent to a respective one of said circular projections and identifying an inner diameter size of a round, hollow tube with a smallest inner diameter that can be fitted over said respective one of said projections.

7. A mouse pad comprising:
    a base having a mouse receiving surface adapted to receive a mouse,
    said base including a plurality of apertures representing a template, said base including a side surface, said side surface having extending therefrom a plurality of circular projections having respectively different diameters adapted to measure an inner diameter of a hollow tube.

8. A mouse pad comprising:

a base having a mouse receiving surface adapted to receive a mouse, said base including a plurality of apertures representing a template, each of said apertures having a respectively different geometric shape.

9. The mouse pad of claim 7, wherein said mouse receiving surface includes a ruler thereon having graduation marks and numbers, said ruler adapted to measure distance.

10. A mouse pad comprising:

a base having a mouse receiving surface adapted to receive a mouse, said base including a plurality of projections adapted to measure an inner diameter of a hollow tube, said projections being circular in shape and being respectively different diameters.

11. The mouse pad of claim 10, wherein said mouse receiving surface includes a plurality of numbers thereon, each of said numbers being positioned adjacent to a respective one of said projections and identifying an inner diameter size of a round, hollow tube with a smallest inner diameter that can be fitted over said respective one of said projections.

12. A mouse pad comprising:

a base having a mouse receiving surface adapted to receive a mouse, said base including a plurality of projections adapted to measure an inner diameter of a hollow tube, said base including a side surface and said plurality of projections extending from said side surface.

13. A mouse pad comprising:

a base having a mouse receiving surface adapted to receive a mouse, said base including a plurality of projections adapted to measure an inner diameter of a hollow tube, said base including a needle gauge aperture adapted to measure a gauge size of a needle.

* * * * *